United States Patent [19]

Young

[11] 4,002,542
[45] Jan. 11, 1977

[54] THIN FILM CAPACITOR AND METHOD

[75] Inventor: Peter L. Young, Horseheads, N.Y.

[73] Assignee: Corning Glass Works, Corning, N.Y.

[22] Filed: Feb. 9, 1976

[21] Appl. No.: 656,525

[52] U.S. Cl. .............................. 204/38 A; 29/25.42; 29/570; 204/192; 204/56 R; 204/298; 317/258
[51] Int. Cl.² .................. C25D 5/00; C23C 15/00; H01G 7/00
[58] Field of Search ............... 204/38 A, 192, 56 R; 29/25.42, 570; 317/258

[56] References Cited

UNITED STATES PATENTS

| | | | |
|---|---|---|---|
| 2,993,266 | 7/1961 | Berry | 29/25.42 |
| 3,257,305 | 6/1966 | Varga | 204/192 |
| 3,275,915 | 7/1966 | Harendza-Harinxma | 317/258 |
| 3,544,434 | 12/1970 | Giller et al. | 204/38 A |
| 3,664,931 | 5/1972 | Gerstenberg | 204/38 A |
| 3,969,197 | 7/1976 | Tolar et al. | 204/15 |

OTHER PUBLICATIONS

P. Lloyd, "Thin-Film Capacitors Using Tantalum Oxide Dielectrics Prepared by Reactive Sputtering", *Solid State Electronics*, July 1961, pp. 74-75.

*Primary Examiner*—John H. Mack
*Assistant Examiner*—Aaron Weisstuch
*Attorney, Agent, or Firm*—Walter S. Zebrowski; Clarence R. Patty, Jr.

[57] ABSTRACT

A method of forming a thin film capacitor having a tantalum oxide dielectric is described. A dielectric substrate having a non-tantalum electrically conductive film electrode formed thereon is disposed within a vacuum environment. A film of tantalum oxide is applied over the conductive film within the vacuum environment. The composite is then removed from the vacuum environment and disposed within an anodizing bath wherein an electrical current is passed through the tantalum oxide film, the current being substantially constant until a predetermined desired voltage is reached. Thereafter, a second electrically conductive film electrode is disposed over the so-formed tantalum oxide film.

5 Claims, 5 Drawing Figures

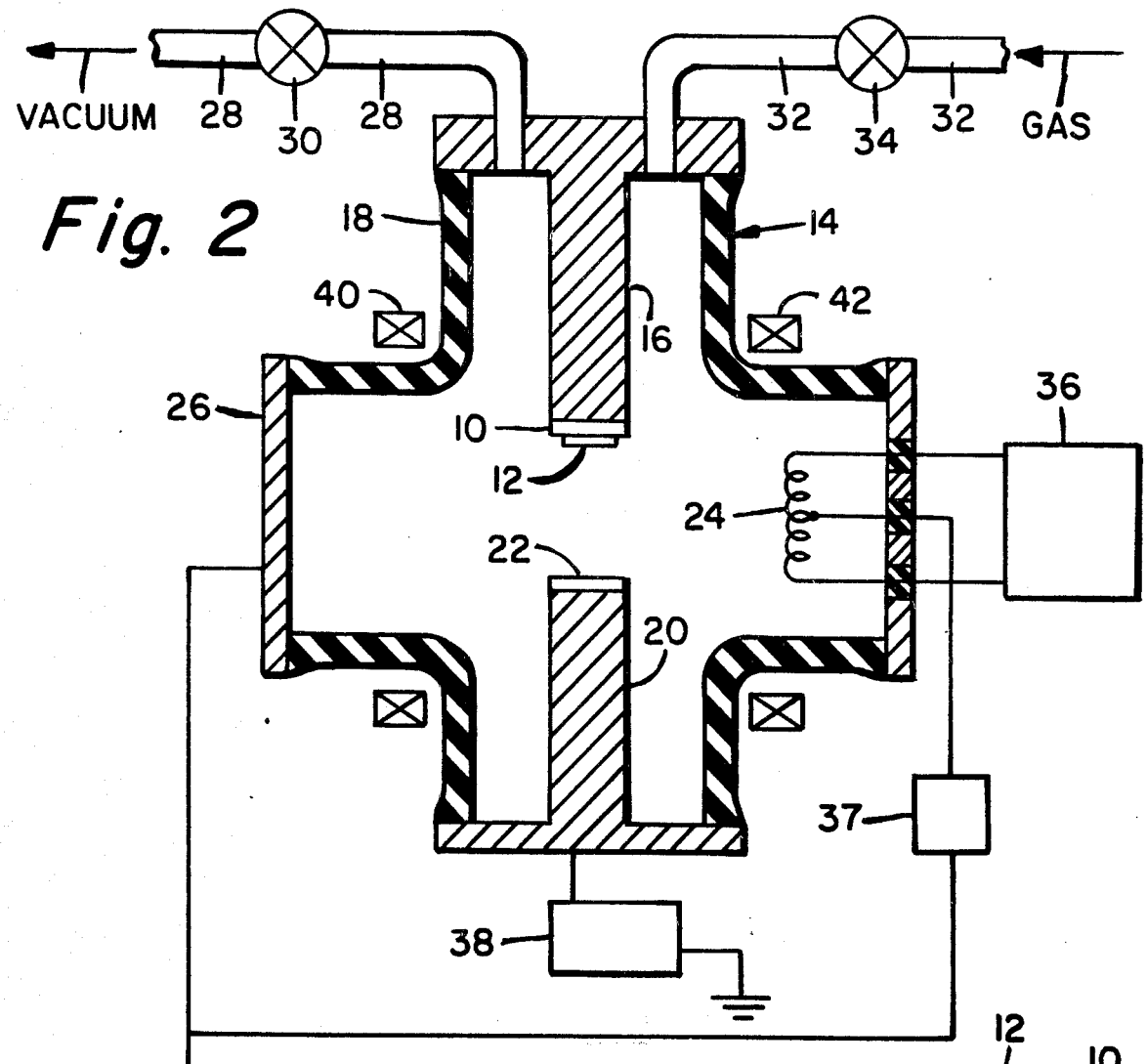

THIN FILM CAPACITOR AND METHOD

BACKGROUND OF THE INVENTION

1. Field of the Invention

The present invention relates to a method of forming and treating a thin film of tantalum oxide suitable for use as the dielectric in a thin film capacitor.

2. Description of the Prior Art

In the manufacture of thin film capacitors, it has heretofore been necessary to first form a thin film of tantalum as the first electrode on a dielectric substrate. This composite would then be placed in an anodizing bath to form a layer of tantalum oxide on the tantalum film, which procedure required an abnormally long period of time, thereby adding greatly to the cost of manufacturing a capacitor. Capacitors produced by such methods required the use of tantalum metal, resulting in a device having polar characteristics. Further, when in the past a definite capacitor pattern was required, complicated and time consuming photolithographic, or the like techniques were required to produce well defined edges to reduce edge effect problems.

Prior art efforts to form tantalum oxide dielectric layers on non-tantalum electrodes resulted in a significant reduction in the value of breakdown voltage with a large increase in leakage current.

SUMMARY OF THE INVENTION

An object of this invention is to provide a method of fabricating a non-polar tantalum oxide thin film capacitor without reducing the capacitance or the electrical series resistance as compared with prior art capacitors.

Further objects of this invention are to provide a method for forming a thin film capacitor which is economical, reduces the time of fabrication, eliminates the need for use of tantalum, precious metals, or other expensive metals, one which can readily provide any desired capacitor pattern and one which overcomes the heretofore noted disadvantages.

Broadly, according to the present invention, a suitable dielectric substrate is provided, to which is applied a non-tantalum electrically conductive film electrode. The substrate and conductive film are then disposed within a vacuum environment and a film of tantalum oxide of desired thickness is applied over the conductive film within the vacuum environment. The composite so formed is then removed from the vacuum environment and disposed within an anodizing bath where an electrical current is passed through the tantalum oxide film, the current being substantially constant until a predetermined desired voltage is reached. After the composite is removed from the anodizing bath, a second nontantalum electrically conductive film electrode is formed over the dielectric film.

Additional objects, features, and advantages of the present invention will become apparent to those skilled in the art from the following detailed description and the attached drawing in which, by way of example, only the preferred embodiment of this invention is illustrated.

BRIEF DESCRIPTION OF THE DRAWING

FIG. 1 is a cross-sectional view of a dielectric substrate with a first electrically conductive film electrode applied thereto.

FIG. 2 is a diagrammatic cross-sectional view of an r-f sputtering apparatus suitable for use in the method of the present invention.

FIG. 3 is a cross-sectional view of the composite of FIG. 1 over which electrode a dielectric film has been applied.

FIG. 4 is a cross-sectional view of an anodizing bath in which the composite of FIG. 3 is disposed.

FIG. 5 is a cross-sectional view illustrating a capacitor formed by the present method.

DETAILED DESCRIPTION OF THE DRAWING

It is to be noted that the drawings are illustrative and symbolic of the invention, and there is no intention to indicate scale or relative proportions of the elements shown therein. For the purposes of simplicity, the present invention will be described in connection with the formation of a tantalum oxide film suitable for use as a dielectric in a capacitor.

Referring to FIG. 1 of the drawing, there is shown a dielectric substrate 10 to which is applied a non-tantalum electrically conductive film electrode 12. The material of dielectric substrate 10 may be any suitable dielectric material such as glass, ceramic, glass-ceramics, or the like. The material of electrode 12 may be any electrically conductive material which is compatible with tantalum oxide as well as compatible with the method of applying a film of tantalum oxide thereto, such for example as aluminum, chromium nichrome, or the like.

Referring also to FIG. 2, the composite so formed is disposed within a typical r-f triode sputtering apparatus 14. Apparatus 14 consists of a substrate holder 16 attached to one opening of apparatus housing 18. Adjacent to and opposite substrate holder 16 is target holder 20 attached to housing 18 at another opening therein. Target material 22 is disposed on holder 20 and is generally held in place by gravity, whereas substrate 10 and electrode 12 are disposed on substrate holder 16 and generally held in place by peripheral or exterior means such as clamps, or the like, not shown.

A filament cathode 24 is disposed within housing 18 while anode 26 is disposed over still another opening in housing 18. A vacuum pump, not shown, or other vacuum means is connectable to housing 18 by means of conduit 28 through control valve 30. A source of inert ionizable gas, not shown, is also connectable to apparatus housing 18 through conduit 32 and control valve 34. Electron producing filament cathode 24 is connected to a suitable dc power source 36 while anode 26 is illustrated connected to filament cathode 24 through a suitable dc power source 37. Target holder 20 is connected to a suitable r-f power source 38. A pair of magnetic coils 40 and 42 are disposed about the exterior of apparatus housing 18 and are also connected to a suitable source of electrical energy, not shown.

The dielectric substrate-electrode composite of FIG. 1 is disposed on substrate holder 16 while a target of tantalum oxide 22 is disposed on target holder 20 within housing 18. Housing 18 is then sealed and a predetermined desired vacuum is drawn therein. The amount of vacuum drawn depends on the materials involved in the sputtering as well as, to some extent, on the electrical parameters of the various parts of the apparatus. A quantity of inert ionizable gas is then introduced into housing 18 reducing the vacuum to a predetermined desired level. One familiar with the art can readily select a suitable level of vacuum for a specific set of parameters. The ionizable gas may be any suitable inert ionizable gas such as argon, xenon, nitrogen, or the like. A plasma is then initiated by means of filament cathode 24, anode 26, and dc power sources 36 and 37, while suitable r-f energy is applied to target material 22 by r-f power source 38. If desired, magnetic coils 40 and 42 may be energized to focus the plasma. Under these described conditions, target material 22 will be caused to sputter and be applied over electrode 12 on substrate 10. When desired, a mask may be interposed over electrode 12 to pattern the application of the target material on electrode 12. Such a mask is not shown, however, its nature will be readily understood by one familiar with the art. After a suitable sputtering period of time, a layer or film 44 of target material 22 will be applied to electrode 12 as illustrated in FIG. 3. As heretofore described, the target material for thin film capacitors will be tantalum oxide, $Ta_2O_5$, which will comprise the capacitor dielectric. Although the preceeding describes a process of r-f triode sputtering from a $Ta_2O_5$ target, layer or film 44 may be applied by reactive sputtering from a tantalum target, by electron beam evaporation from a $Ta_2O_5$ target, by r-f diode sputtering from a $Ta_2O_5$ target, or by like methods.

In the formation of a $Ta_2O_5$ film as heretofore described, the resulting film will be non-stoichiometric, that is it will be somewhat oxygen deficient. A capacitor formed with such a non-stoichiometric dielectric film will be lossy, that is, have a high loss tangent, and will have an increased leakage current. As will be understood, a capacitor under these conditions will have a decreased breakdown voltage.

Referring now to FIG. 4, the composite formed as illustrated in FIG. 3 is further treated in accordance with the method of the present invention by placing the composite in an anodizing bath 46 within container 48. A suitable dc power source 50 is connected to electrode 12 and bath 46, and a suitable electrical current is passed through tantalum oxide layer or film 44. The current is held substantially constant until a predetermined voltage is reached. It has been found that such additional treatment for a predetermined period of time cures the non-stoichiometric condition of layer 44, that is, the resulting $Ta_2O_5$ layer or film is no longer oxygen deficient, whereupon the capacitor becomes less lossy, its breakdown voltage is significantly increased, and its leakage current is greatly reduced. The capacitor is then removed from the anodizing bath and a counter electrode 52 is applied over dielectric film 44 as shown in FIG. 5. Counter electrode 52 as well as electrode 12 can be applied by any suitable method known in the art, such as for example, physical vapor deposition, electron beam evaporation, or the like. Since electrode 12 and counter electrode 52 need not be formed of tantalum metal, (rather may be formed of aluminum or the like), much cost of manufacturing the resulting product may be saved. Further, non-polar capacitor characteristics can be easily achieved without reducing the capacitance and/or increasing the electrical series resistance.

A typical example of the present invention is as follows. A 3000A thick layer of aluminum is deposited on a 1 inch diameter glass substrate by physical vapor deposition to form the base electrode. The base electrode has an area of 5.07 cm². The substrate-electrode composite was placed in an r-f sputtering apparatus such as is illustrated in FIG. 2 and was attached to substrate holder 16 by means of suitable peripheral clamps. The aluminum electrode was exposed to a tantalum oxide target disposed on a target holder adjacent and in opposition to the aluminum electrode. The r-f sputtering apparatus was secured and a vacuum of $10^{-6}$ Torr was drawn. A quantity of argon gas was then introduced into the apparatus until the vacuum environment reached $5 \times 10^{-3}$ Torr. A plasma was created between the target holder and the aluminum electrode by both energizing the anode and filament dc power sources and by electrons which were emitted from the filament cathode and transmitted to the anode. The anode dc power source was energized to a voltage of 110 volts while the filament dc power source was energized to a voltage of about 20 volts. An r-f power source connected to the target holder and the tantalum oxide was energized, whereupon the tantalum oxide was at a voltage of −2000 volts to ground at a frequency of 3.68 mHz. Under these conditions, tantalum oxide was caused to be sputtered from the target onto the surface of the aluminum electrode until a layer of tantalum oxide having a thickness of 2000A and an area of 5 cm² was deposited on the aluminum film. The period of time required for sputtering such a thickness of tantalum oxide was about 6 minutes. The substrate-electrode-tantalum oxide composite was allowed to cool and the environment within the chamber was brought to atmospheric pressure by introducing nitrogen gas therein. The composite was removed from the sputtering apparatus and one electrode of a dc power source was connected to the aluminum base electrode and the composite immersed in a 0.1 N citric acid solution anodizing bath at a temperature of 25° C. A constant current of 0.1 ma was passed through the tantalum oxide layer until a voltage of 115 volts was reached in about 5 seconds. The composite was then removed from the anodizing bath, suitably washed and dried, and 81 counter electrodes of aluminum with an area of 0.00785 cm² each were vapor deposited onto the dielectric film of tantalum oxide. The resulting capacitors had typical capacitance of about 1000 pfd. and a breakdown voltage of about 75 volts. Breakdown voltage is defined as that voltage necessary for a leakage current equal to or less than $10^{-9}$ amp. for a 1000 pfd. capacitor. The loss tangent at 1 KHz was less than 0.005 and the leakage current at 75 volts was less than $10^{-9}$ amp. for each capacitor. The resulting capacitors were further found to be non-polar.

It is to be noted that the only tantalum used in the construction of such a capacitor was the tantalum embodied in the tantalum oxide dielectric. The plurality of counter electrodes were deposited as in commercial practice, the composite being capable of being subsequently cut apart into individual capacitor units as desired.

Although the present invention has been described with respect to details of certain embodiments thereof, it is not intended that such details be limitations upon the scope of the invention except insofar as set forth in the following claims.

I claim:

1. A method of forming a capacitor comprising the steps of
   providing a dielectric substrate,
   applying to said dielectric substance a non-tantalum electrically conductive film to form a first capacitor electrode,
   disposing said substrate and conductive film within a vacuum environment, applying a film of tantalum oxide of desired thickness over said conductive film within said vacuum environment, removing said composite so formed from said vacuum environment providing a liquid anodizing bath, thereafter disposing said composite in said liquid anodizing bath, passing an electrical current through said tantalum oxide film, said current being substantially constant until a predetermined desired voltage is reached, and removing said composite from said anodizing bath.

2. The method of claim 1 wherein said film of tantalum oxide was applied by r-f sputtering.

3. The method of claim 1 further comprising the step of applying an electrically conductive film over said film of tantalum oxide to form a counter capacitor electrode.

4. The method of claim 3 wherein one of said electrically conductive films is formed of aluminum.

5. The method of claim 4 wherein the other of said electrically conductive films is formed of aluminum.

* * * * *